United States Patent
Blum et al.

(10) Patent No.: US 7,552,210 B1
(45) Date of Patent: Jun. 23, 2009

(54) METHOD OF AND SYSTEM FOR HANDLING COOKIES

(75) Inventors: Daniel Blum, Stuttgart (DE); Jan Paul Buchwald, Boeblingen (DE); Richard Jacob, Ostfildern (DE); Timo Kussmaul, Boeblingen (DE); Oliver Then, Aidlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/190,297

(22) Filed: Aug. 12, 2008

(51) Int. Cl.
*G06F 15/173* (2006.01)

(52) U.S. Cl. .................. 709/223; 709/218; 709/202; 726/3

(58) Field of Classification Search ............... 709/223, 709/218, 202; 726/3
See application file for complete search history.

(56) References Cited

U.S. PATENT DOCUMENTS 6,839,680 B1  1/2005 Liu et al.
2005/0216845 A1  9/2005 Wiener
2006/0036875 A1  2/2006 Karoubi
2006/0156387 A1  7/2006 Eriksen
2006/0174327 A1  8/2006 Song et al.

FOREIGN PATENT DOCUMENTS

EP          1 783 634 A1    5/2007
WO        WO 99/64967      12/1999

*Primary Examiner*—Thanh Tammy Nguyen
(74) *Attorney, Agent, or Firm*—Dillon & Yudell LLP

(57) ABSTRACT

A method of handling cookies defines a scope attribute, which is in addition to a domain attribute and path attribute. The method allocates separate storage areas for cookies according to identified scopes and a global storage area for cookies with unidentified scopes. The method determines if a cookie received with a response includes an identified scope. If so, the method stores the cookie in the storage area allocated to the identified scope of the cookie. If the cookie has an unidentified scope, the method stores the cookie in the global storage area. The method determines a scope, domain and path for an outgoing request. The method retrieves and attaches to the outgoing request cookies from the global storage area having the determined domain and path. If the outgoing request is associated with an identified scope, the method additionally retrieves all cookies having the determined domain and path from the storage area allocated to the scope of the outgoing request and attaches the retrieved cookies to the outgoing request.

1 Claim, 4 Drawing Sheets

METHOD OF AND SYSTEM FOR HANDLING COOKIES

BACKGROUND OF THE INVENTION

1. Technical Field

The present invention relates in general to the field of HTTP client processing and more particularly to an improved method of and system for handling cookies in an HTTP client.

2. Description of the Related Art

HTTP cookies are packets of text that an HTTP server sends to an HTTP client as part of a response. Currently, cookies are identified by a unique name, and the server domain and a path within the server domain. The client stores the cookies it receives. When the client accesses the server again with an HTTP request, the client attaches to the request any cookies stored for the server domain and path. Cookies allow servers to maintain specific information about a particular client. Examples of cookie content include session and/or authentication information, tracking information for usage statistics, user specific site preferences, and dynamic content, such as a shopping cart. A cookie may also specify an expiration date and a flag that it may be sent by the client only when the connection is secure.

The current methods of handling cookies lead to certain ambiguities and problems. Current cookie clients cannot handle several instances of a cookie with the identical name, domain, and path. This limitation leads to problems when the client attempts to access a resource on a server in different contexts. For example, if the user attempts to have concurrent sessions with one server resource, both sessions will use the same cookies. Accordingly, the server resource will not be able to distinguish between the sessions. Examples of concurrent sessions include multiple browser instances on the client or multiple tabs within a single browser instance.

SUMMARY OF THE INVENTION

The present invention provides a method of and a system for handling cookies. The cookies include a domain attribute and a path attribute. The method defines a scope attribute, which is in addition to a domain attribute and path attribute. The method allocates separate storage areas for cookies according to identified scopes. The method allocates a global storage area for cookies with unidentified scopes. The method receives incoming responses, which include cookies. The method determines if a cookie received with a response includes an identified scope. If so, the method stores the cookie in the storage area allocated to the identified scope of the cookie. If the cookie has an unidentified scope, the method stores the cookie in the global storage area. The method determines a scope, domain and path for an outgoing request. For each outgoing request, the method retrieves all cookies having the determined domain and path from the global storage area and attaches the retrieved cookies to the outgoing request. If the outgoing request is associated with an identified scope, the method additionally retrieves all cookies having the determined domain and path from the storage area allocated to the scope of the outgoing request and attaches the retrieved cookies to the outgoing request.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
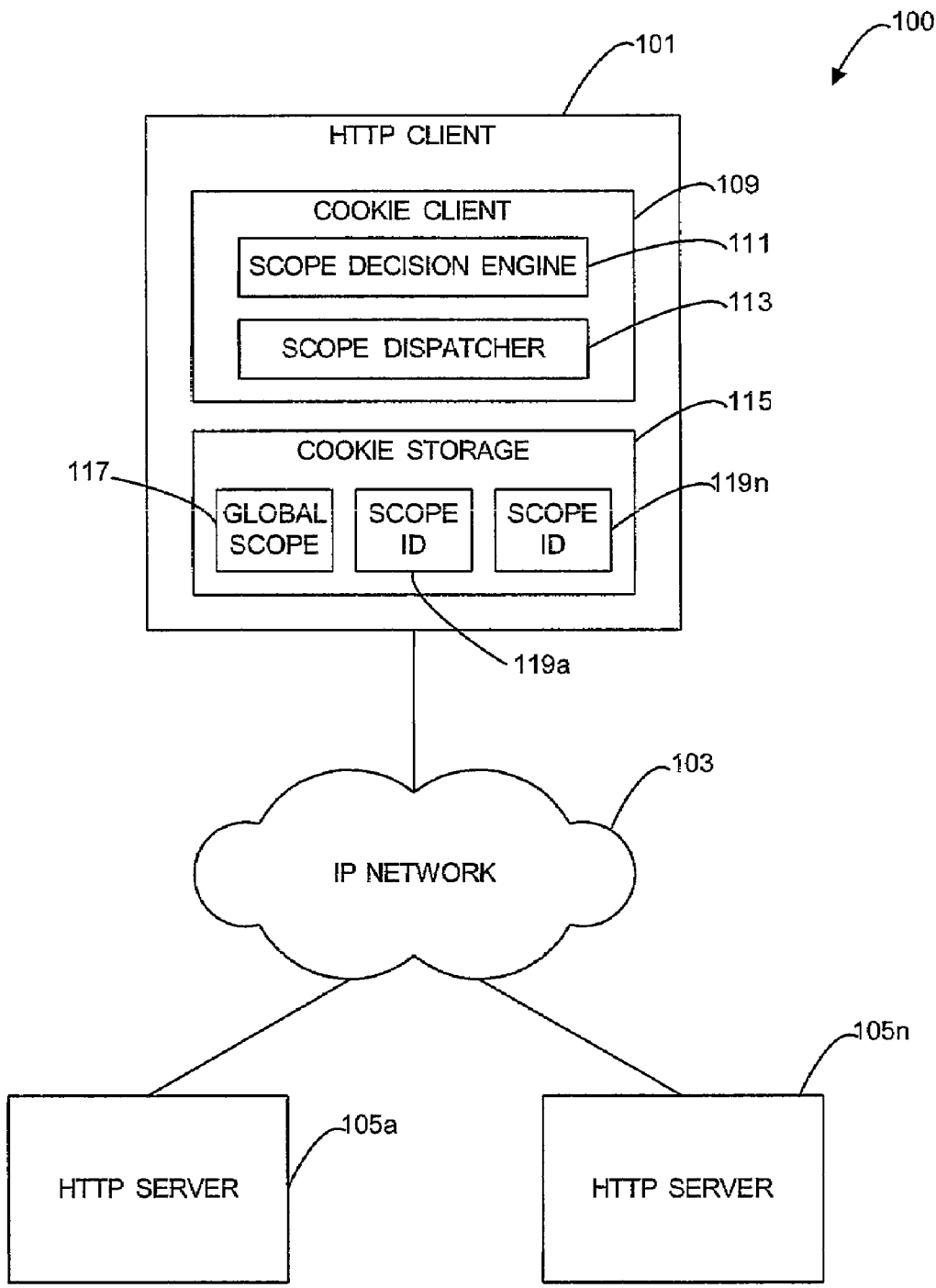
FIG. 1 is a block diagram of an embodiment of a system according to the present invention.

Referring now to drawings, and first to FIG. 1, an embodiment of a system according to the present invention is designated generally by the numeral 100. System 100 includes an HTTP client 101 that is in communication with an IP network 103. Also in communication with network 103 are a plurality of HTTP servers 105.

HTTP client 101 may be implemented in any suitable computer, such as a desktop computer, workstation, laptop computer, or the like. HTTP client 101 includes a suitable operating system and a network interface (neither shown) that enable HTTP client to communicate with IP network 103.

HTTP client 101 includes a cookie client 109. As will explained in detail hereinafter, cookie client 109 handles cookies for HTTP client 101 by attaching cookies to requests HTTP client 101 sends to HTTP servers 105 and by storing cookies received from HTTP servers 105 by HTTP client 101. Cookie client 109 includes a scope decision engine 111 and a scope dispatcher 113. Scope is a new cookie attribute according to the present invention. As will be explained in detail hereinafter, scope decision engine 111 determines the scope of a request issued by HTTP client 101 and the cookies received with responses from HTTP clients 105. Scope dispatcher 113 stores and retrieves cookies according to scopes determined by scope decision engine 111.

HTTP client 101 includes a cookie storage area 115. HTTP client 101 allocates portions of cookie storage area 115 to different scopes as determined by scope decision engine 111. Cookie storage area 115 includes a global storage area 117. Cookie storage area 115 also includes separate storage areas 119. As scope decision engine 111 defines scopes identified by scope IDs, HTTP client 101 allocates space within cookie storage 115 to those scopes. Scope dispatcher 113 stores in and retrieves from scope ID storage 119 cookies according to scope ID as determined by scope decision engine 111.

Figure 2:
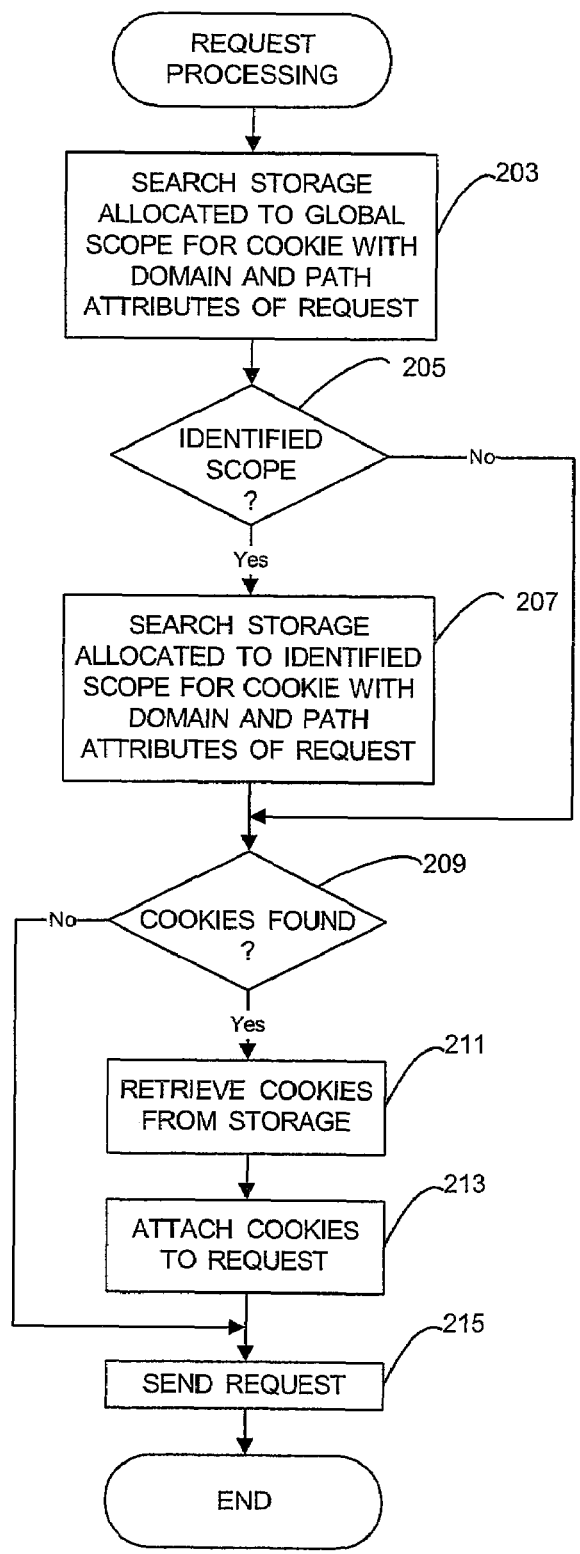
FIG. 2 is a flow chart of an embodiment of client request processing according to the present invention.

FIG. 2 is a flow chart of an embodiment of client request processing according to the present invention. First, the system searches storage allocated to global scope for cookies with the domain and path attributes of the request, as indicated at block 203. Then, the system determines, at decision block 205, if the request is associated with an identified scope. If, as determined at decision block 205, the request is associated with an identified scope, the system searches storage allocated to the identified scope for cookies with a domain and path attributes of the request, as indicated at block 207. After having searched for cookies at blocks 203 and 207, the system determines, at decision block 209, if cookies have been found. If not, the system sends the request without any cookie, at block 215. If as determined at decision block 209, cookies are found, the system retrieves the cookies from storage, at block 211, and attaches the cookies to the request, at block 213. Then, the system sends the request, at block 215.

Figure 3:
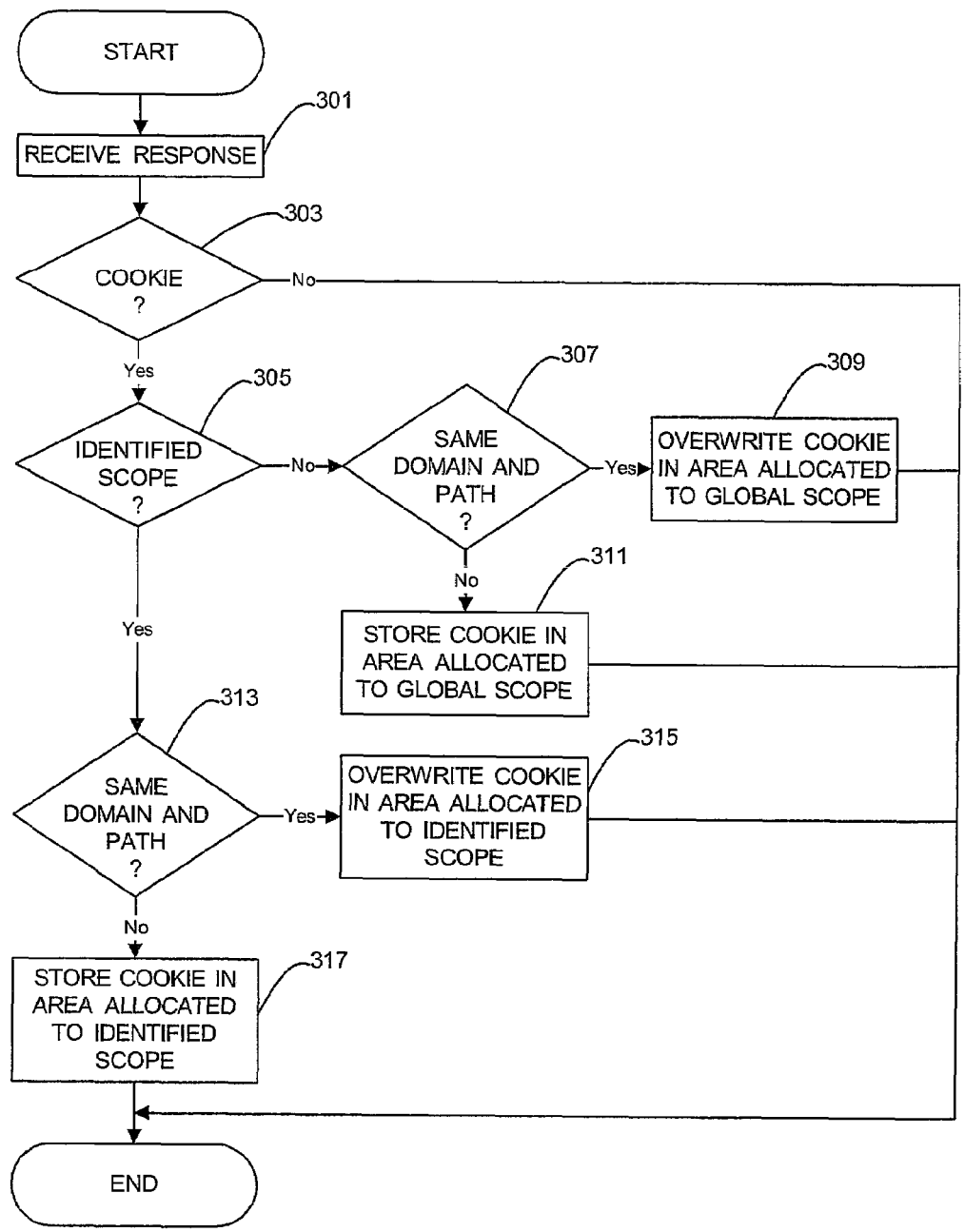
FIG. 3 is a flow chart of an embodiment of client response processing according to the present invention; and, FIG. 4 is a flow chart of an embodiment of client scope processing according to the present invention.

FIG. 3 is a flow chart of an embodiment of client response cookie processing according to the present invention. A system receives a response, at block 301. The system determines, at decision block 303, if the cookie is attached to the response. If not, client response cookie processing ends. If, as determined at decision block 303, the response includes a cookie, the system determines, at decision block 305, if the cookie is associated with an identified scope. If not, the system determines, at decision block 307, if a cookie with the same domain and path is stored in global storage. If so, the system overwrites the cookie in global storage with the received cookie, at block 309. If, as determined at decision block 307, a cookie with the same domain and path as the received cookie is not in global storage, the system stores the received cookie in the area allocated global storage, at block 311. If, as determined at decision block 305, the received cookie is associated with an identified scope, the system determines, at decision block 313, if a cookie having the same domain and path as the received cookie is stored in the area allocated to the identified scope. If so, the system overwrites the cookie stored in the area allocated to the identified scope with the received cookie, at block 315. If not, the system stores the cookie in the area allocated to be identified scope, at block 317.

Figure 4:
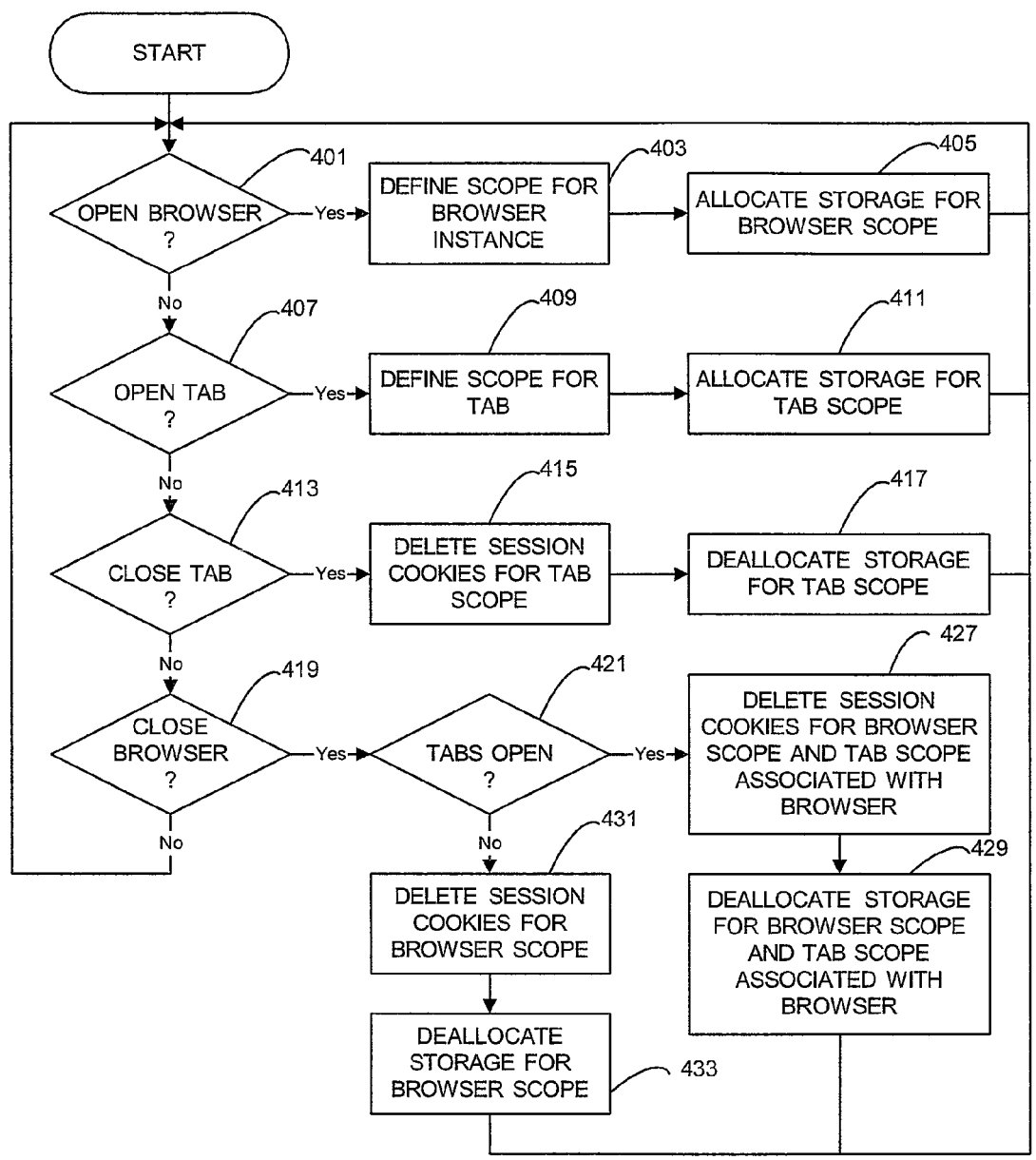

FIG. 4 is a flow chart of an example of an embodiment of cookies scope processing according to the present invention. If, as determined at decision block 401, the user opens a browser, the system defines a scope for the browser instance, at block 403, and allocates storage space for the browser scope, at block 405. If, as determined at decision block 407, the user opens a new tab in the browser, the system defines a scope for the new tab, at block 409, and allocates storage for the new tab scope, at block 411. If, as determined at decision block 413, the system may delete session cookies for the tab scope, at block 415, and deallocates storage for the tab scope, at block 417. If, as determined at decision block 419, the user attempts to close the browser, the system determines, at decision block 421, if tabs are open. If, as determined at decision block 421, there are tabs open, the system deletes session cookies for the browser scope and the tab scopes associated with the browser, at block 427. Then, the system deallocates storage for the browser scope and tab scopes associated with the browser, at block 429. If, as determined at decision block 421, tabs are not open, the system deletes session cookies for the browser scope, at block 431, and deallocates storage for the browser scope at block 433.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method for handling cookies, said cookies including a domain attribute and a path attribute, which comprises:

defining in a client system a scope attribute for cookies, said scope attribute being in addition to a domain attribute and path attribute;

allocating separate storage areas in said client system for cookies according to identified scopes;

allocating a global storage area in said client system for cookies with unidentified scopes;

receiving incoming responses from server systems at said client system, said responses including cookies;

determining if a cookie received at said client system with a response includes an identified scope;

if said cookie received with said response includes an identified scope, determining if said storage in said client system allocated to said identified scope contains a stored cookie with the same domain and path as said received cookie;

if said storage in said client system allocated to said identified scope contains a stored cookie with the same domain and path as said received cookie, overwriting said stored cookie with said received cookie;

if said storage in said client system allocated to said identified scope does not contain a stored cookie with the same domain and path as said received cookie, storing said received cookie that includes said identified scope identifier in the storage area allocated to the identified scope of said cookie;

if said cookie received with said response is received with an unidentified scope, determining if said storage in said client system allocated to said global scope contains a stored cookie with the same domain and path as said received cookie;

if said storage in said client system allocated to said global scope contains a stored cookie with the same domain and path as said received cookie, overwriting said stored cookie with said received cookie;

if said storage in said client system allocated to said global scope does not contain a stored cookie with the same domain and path as said received cookie storing said cookie received with said unidentified scope in said global storage area;

determining a domain and path for an outgoing request from said client system to a server system;

determining if said outgoing request from said client system to a server system is associated with an identified scope;

if said outgoing request is associated with an identified scope, retrieving all cookies having said determined domain and path from the storage area allocated to the identified scope of said outgoing request, and attaching said retrieved cookies to said outgoing request; and, if said outgoing request is not associated with an identified scope, retrieving all cookies having said determined domain and path from the global storage area, and attaching said retrieved cookies to said outgoing request.

* * * * *